United States Patent
Oda et al.

(10) Patent No.: US 11,371,568 B2
(45) Date of Patent: Jun. 28, 2022

(54) DRIVING FORCE TRANSMISSION DEVICE AND CONTROL METHOD FOR DRIVING FORCE TRANSMISSION DEVICE

(71) Applicant: JTEKT CORPORATION, Osaka (JP)

(72) Inventors: Ichiro Oda, Toyokawa (JP); Go Nagayama, Toyama (JP); Tomonori Ono, Yatomi (JP); Takashi Kouzai, Kariya (JP)

(73) Assignee: JTEKT CORPORATION, Osaka (JP)

( * ) Notice: Subject to any disclaimer, the term of this patent is extended or adjusted under 35 U.S.C. 154(b) by 63 days.

(21) Appl. No.: 17/101,473

(22) Filed: Nov. 23, 2020

(65) Prior Publication Data
US 2021/0162859 A1 Jun. 3, 2021

(30) Foreign Application Priority Data

Nov. 29, 2019 (JP) .............................. JP2019-216230

(51) Int. Cl.
*F16D 27/115* (2006.01)
*B60K 17/02* (2006.01)
*F16D 48/06* (2006.01)

(52) U.S. Cl.
CPC ............ *F16D 27/115* (2013.01); *B60K 17/02* (2013.01); *F16D 48/064* (2013.01); *F16D 2500/50287* (2013.01); *F16D 2500/70418* (2013.01)

(58) Field of Classification Search
CPC .................. F16D 27/115; F16D 48/064; F16D 2500/50287; F16D 2500/70418
See application file for complete search history.

(56) References Cited

U.S. PATENT DOCUMENTS

| | | | | |
|---|---|---|---|---|
| 5,492,194 | A * | 2/1996 | McGinn | F16D 27/115 701/93 |
| 10,527,112 | B2 * | 1/2020 | Kato | F16D 13/52 |
| 10,550,897 | B2 * | 2/2020 | Kato | B60K 17/02 |
| 11,168,751 | B2 * | 11/2021 | Oda | F16D 48/064 |
| 11,220,267 | B2 * | 1/2022 | Sobue | B60W 30/18172 |
| 2019/0072137 | A1 * | 3/2019 | Kato | F16D 13/52 |
| 2019/0072142 | A1 * | 3/2019 | Kato | F16D 13/74 |
| 2021/0164527 | A1 * | 6/2021 | Oda | F16D 13/52 |
| 2021/0206373 | A1 * | 7/2021 | Sobue | B60W 30/1843 |
| 2021/0222741 | A1 * | 7/2021 | Oda | F16D 27/115 |

FOREIGN PATENT DOCUMENTS

| | | |
|---|---|---|
| JP | 2007-64251 A | 3/2007 |
| JP | 2009-14134 A | 1/2009 |

* cited by examiner

*Primary Examiner* — David R Morris
(74) *Attorney, Agent, or Firm* — Oblon, McClelland, Maier & Neustadt, L.L.P.

(57) ABSTRACT

A driving force transmission device includes an input rotation member and output rotation member, a multiple-disc clutch, a pressing mechanism, and a control device that includes a current supply circuit. The control device is configured to compute a torque command value based on a state of a vehicle, the torque command value being a driving force that needs to be transmitted by the multiple-disc clutch, to compute a current command value, to correct the current command value, and to control the current supply circuit such that an electric current depending on the current command value is supplied to the pressing mechanism. The control device is configured to perform the correction so as to increase or decrease the current command value by a correction amount depending on a change rate of the torque command value.

7 Claims, 10 Drawing Sheets

DRIVING FORCE TRANSMISSION DEVICE AND CONTROL METHOD FOR DRIVING FORCE TRANSMISSION DEVICE

CROSS-REFERENCE TO RELATED APPLICATION

This application claims priority to Japanese Patent Application No. 2019-216230 filed on Nov. 29, 2019, incorporated herein by reference in its entirety.

BACKGROUND

1. Technical Field

The disclosure relates to a driving force transmission device that transmits a driving force by a multiple-disc clutch in which frictional sliding among clutch plates is lubricated by a lubricant, and a control method for the driving force transmission device.

2. Description of Related Art

Conventionally, a driving force transmission device that transmits a driving force by a multiple-disc clutch in which frictional sliding among clutch plates is lubricated by a lubricant is used for transmitting the driving force to auxiliary driving wheels of a four-wheel-drive vehicle, for example. As such a driving force transmission device, the applicant has proposed driving force transmission devices described in Japanese Patent Application Publication No. 2007-064251 (JP 2007-064251 A) and Japanese Patent Application Publication No. 2009-014134 (JP 2009-014134 A).

In JP 2007-064251 A, based on a result of an operation test after assembly of a driving force transmission device that transmits an output torque corresponding to an input electric current from a driving source side to an auxiliary driving wheel side in a vehicle, an I-T characteristic that is a characteristic of the input electric current and the output torque is stored in a storage unit, the electric current is controlled based on the I-T characteristic stored in the storage unit. Thereby, variation in characteristics of individual driving force transmission devices is reduced, and the accuracy of an output torque is enhanced.

In JP 2009-014134 A, in the case where a command current value calculated based on a command torque becomes a value higher than a first predetermined current value at which frictional engagement of clutch plates is released, from a value equal to or lower than the first predetermined current value, a determination of start-up time is made. In the case where a command current value at the start-up time is equal to or lower than a second predetermined current value, an inrush current supply control of adding a correction value to the command current value is performed such that the command current value becomes the second predetermined current value. The second predetermined current value is a current value that allows the frictional engagement of clutch plates at equal to or higher than a predetermined response speed (a speed at which a problem of response lag does not occur in use).

SUMMARY

In a driving force transmission device including a multiple-disc clutch in which frictional sliding among clutch plates is lubricated by a lubricant and a pressing mechanism that presses the multiple-disc clutch at a pressing force depending on an electric current that is supplied, the deviation between the command torque and the torque (driving force) that is actually output sometimes increases in the course of increase in the command torque. The inventors have diligently studied causes and countermeasures for the increase in the deviation, and have made the disclosure.

That is, the disclosure makes it possible to reduce the difference between the command torque and the torque that is actually output when the command torque increases, and to enhance the accuracy of the transmission torque of the multiple-disc clutch.

A first aspect of the disclosure is a driving force transmission device. The driving force transmission device includes: an input rotation member and an output rotation member that are configured to perform relative rotation coaxially; a multiple-disc clutch that includes a plurality of clutch plates among which frictional sliding is lubricated by a lubricant; a pressing mechanism that is configured to press the multiple-disc clutch at a pressing force depending on an electric current that is supplied; and a control device that includes a current supply circuit configured to supply the electric current to the pressing mechanism. The output rotation member is configured such that a driving force of a vehicle is transmitted from the input rotation member to the output rotation member by the multiple-disc clutch. The control device is configured to compute a torque command value based on a state of the vehicle, the torque command value being the driving force that needs to be transmitted by the multiple-disc clutch, is configured to compute a current command value corresponding to the torque command value, is configured to correct the current command value, and is configured to control the current supply circuit such that the electric current depending on the current command value corrected by the control device is supplied to the pressing mechanism. The control device is configured to correct the current command value so as to increase or decrease the current command value by a correction amount depending on a change rate of the torque command value.

With the above configuration, it is possible to reduce the difference between the command torque and the torque that is actually output when the command torque increases, and to enhance the accuracy of the transmission torque of the multiple-disc clutch.

A second aspect of the disclosure is a control method for a driving force transmission device. The driving force transmission device includes: an input rotation member and an output rotation member that are configured to perform relative rotation coaxially; a multiple-disc clutch that includes a plurality of clutch plates among which frictional sliding is lubricated by a lubricant; a pressing mechanism that is configured to press the multiple-disc clutch at a pressing force depending on an electric current that is supplied; and a control device. The driving force transmission device is configured to transmit a driving force of a vehicle from the input rotation member to the output rotation member by the multiple-disc clutch. The control method includes: computing, the control device, a torque command value based on a state of the vehicle, the torque command value being the driving force that needs to be transmitted by the multiple-disc clutch; computing, the control device, a current command value corresponding to the torque command value; correcting, the control device, the current command value so as to increase or decrease the current command value by a correction amount depending on a change rate of the torque command value; and supplying, the control device, the electric current depending on the corrected current command value, to the pressing mechanism.

With the above configuration, it is possible to reduce the difference between the command torque and the torque that is actually output when the command torque increases, and to enhance the accuracy of the transmission torque of the multiple-disc clutch.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the disclosure will be described with reference to FIG. 1 to FIG. 11B. The embodiment described below is shown as a preferred specific example for carrying out the disclosure. Various technical matters that are technically preferred are specifically exemplified, but the technical scope of the disclosure is not limited to this specific mode.

Figure 1:
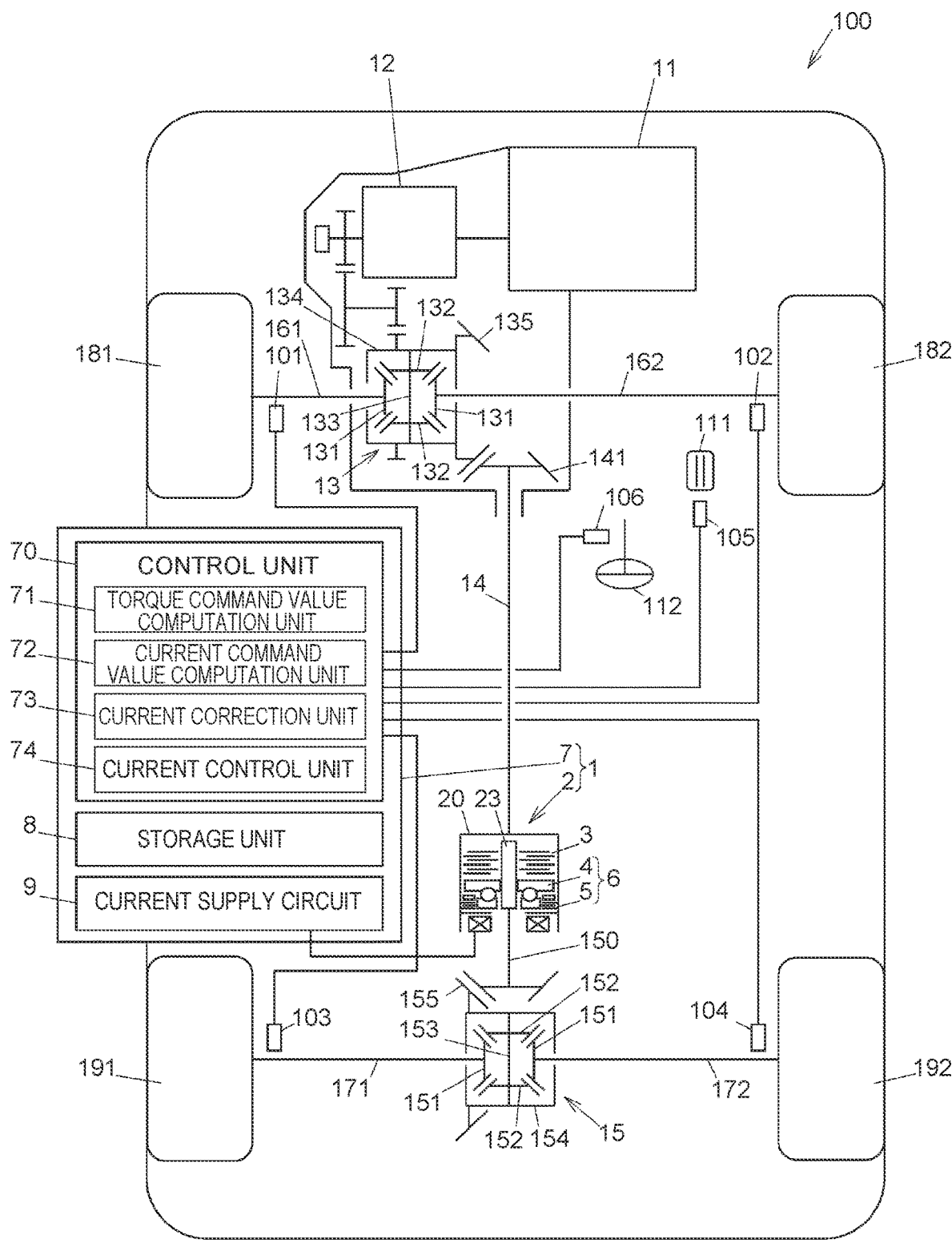
FIG. 1 is a schematic configuration diagram showing a schematic configuration example of a four-wheel-drive vehicle that is equipped with a control device of a driving force transmission device according to an embodiment of the disclosure.

FIG. 1 is a schematic configuration diagram showing a schematic configuration example of a four-wheel-drive vehicle that is equipped with a control device of a driving force transmission device according to the embodiment of the disclosure.

As shown in FIG. 1, a four-wheel-drive vehicle 100 includes an engine 11 as a driving source, a transmission 12 that shifts the output of the engine 11, left and right front wheels 181, 182 as main driving wheels to which the driving force of the engine 11 shifted by the transmission 12 is constantly transmitted, and left and right rear wheels 191, 192 as auxiliary driving wheels to which the driving force of the engine 11 is transmitted depending on a vehicle state of the four-wheel-drive vehicle 100. When the driving force of the engine 11 is transmitted to the left and right front wheels 181, 182 and the left and right rear wheels 191, 192, the four-wheel-drive vehicle 100 becomes a four-wheel-drive state, and when the driving force of the engine 11 is transmitted only to the left and right front wheels 181, 182, the four-wheel-drive vehicle 100 becomes a two-wheel-drive state. Instead of the engine, an electric motor may be used as the driving source, and a so-called hybrid system in which the engine and the electric motor are combined may be used as the driving source.

The four-wheel-drive vehicle 100 includes a front differential 13, a propeller shaft 14, a rear differential 15, a pinion gear shaft 150 that transmits the driving force to the rear differential 15, left and right drive shafts 161, 162 on the front wheel side, left and right drive shafts 171, 172 on the rear wheel side, and a driving force transmission device 1 that transmits the driving force from the propeller shaft 14 to the pinion gear shaft 150.

The four-wheel-drive vehicle 100 is equipped with wheel speed sensors 101 to 104 that detect the rotation speeds of the left and right front wheels 181, 182 and the left and right rear wheels 191, 192, an accelerator pedal sensor 105 that detects the press amount of an accelerator pedal 111, and a steering angle sensor 106 that detects the steering angle of a steering wheel 112. Detection values of the sensors 101 to 106 are examples of the vehicle state of the four-wheel-drive vehicle 100 that is used in the control of the driving force transmission device 1.

The driving force transmission device 1 includes a torque coupling 2 that is disposed between the propeller shaft 14 and the pinion gear shaft 150, and a control device 7 that controls the torque coupling 2, and transmits the driving force depending on the vehicle state from the propeller shaft 14 to the pinion gear shaft 150. The control device 7 can acquire the detection values of the wheel speed sensors 101 to 104, the accelerator pedal sensor 105 and the steering angle sensor 106, and controls the torque coupling 2 by increasing or decreasing an electric current that is supplied to the torque coupling 2.

The driving force of the engine 11 is transmitted to the left and right front wheels 181, 182 through the transmission 12, the front differential 13 and the left and right drive shafts 161, 162 on the front wheel side. The front differential 13 includes a pair of side gears 131 that is respectively coupled to the left and right drive shafts 161, 162 on the front wheel side such that relative rotation cannot be performed, a pair of pinion gears 132 that engages with the side gears 131 such that the gear axes of the pinion gears 132 are orthogonal to the gear axes of the side gears 131, a pinion gear shaft 133 that supports the pinion gears 132, and a front differential case 134 that contains the side gears 131, the pinion gears 132 and the pinion gear shaft 133.

A ring gear 135 is fixed to the front differential case 134, and the ring gear 135 engages with a pinion gear 141 that is provided at a vehicle-front end portion of the propeller shaft 14. A vehicle-rear end portion of the propeller shaft 14 is coupled to a housing 20 of the torque coupling 2. The torque coupling 2 includes an inner shaft 23 that is disposed such that relative rotation can be performed with the housing 20, and a pinion gear shaft 150 is coupled to the inner shaft 23 such that relative rotation cannot be performed. Details of the torque coupling 2 will be described later.

The rear differential 15 includes a pair of side gears 151 that is respectively coupled to the left and right drive shafts 171, 172 on the rear wheel side such that relative rotation cannot be performed, a pair of pinion gears 152 that engages with the side gears 151 such that the gear axes of the pinion gears 152 are orthogonal to the gear axes of the side gears 151, a pinion gear shaft 153 that supports the pinion gears 152, a rear differential case 154 that contains the side gears 151, the pinion gears 152 and the pinion gear shaft 153, and a ring gear that is fixed to the rear differential case 154 and that engages with the pinion gear shaft 150. The rear differential 15 distributes the driving force input from the pinion gear shaft 150, to the left and right rear wheels 191, 192 through the drive shafts 171, 172.

Configuration of Driving Force Transmission Device

Figure 2:
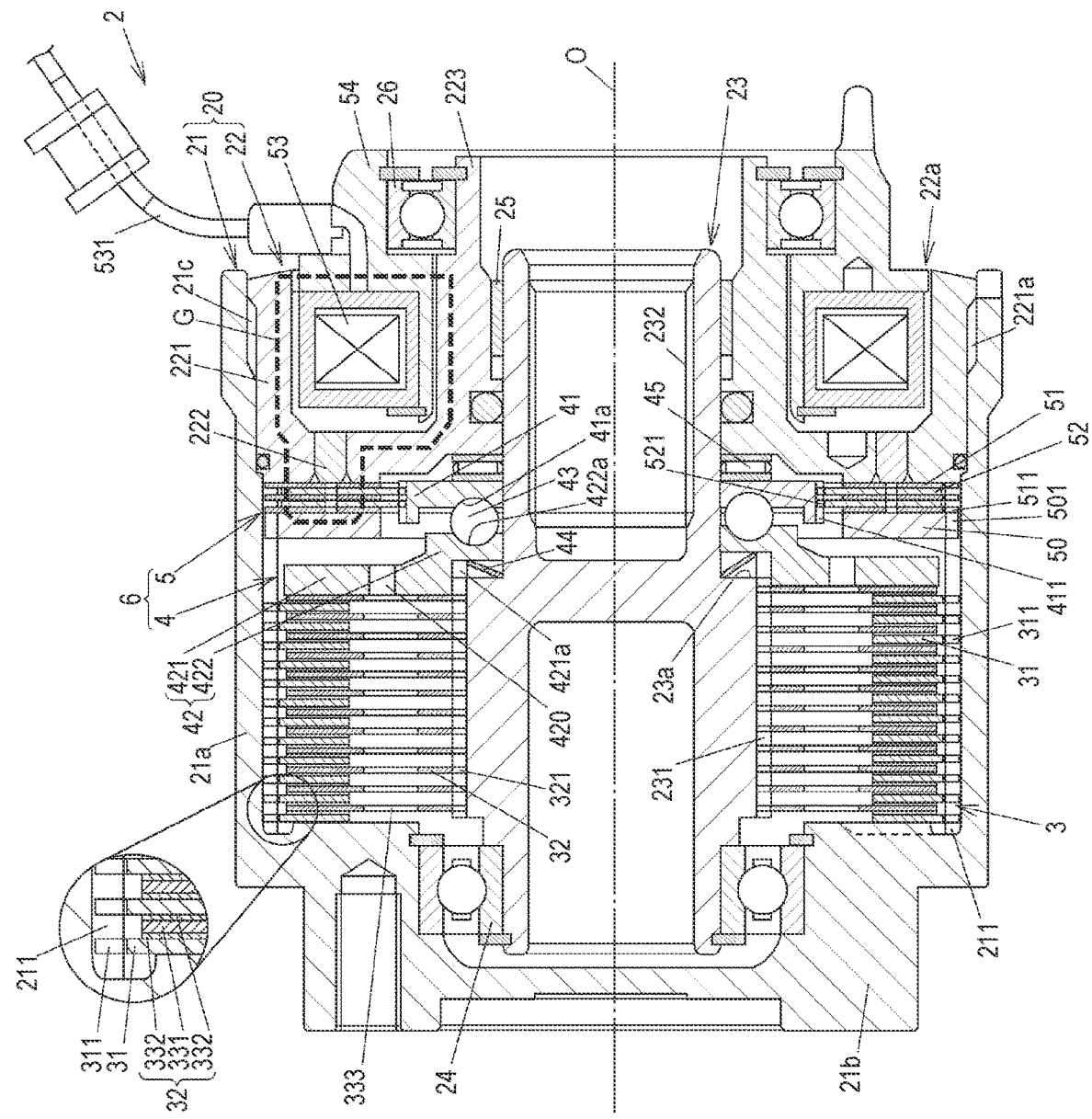
FIG. 2 is a sectional view showing a configuration example of a torque coupling.

FIG. 2 is a sectional view showing a configuration example of the torque coupling 2. In FIG. 2, the upper side of a rotation axis line O shows an actuation state (torque transmitting state) of the torque coupling 2, and the lower side shows a non-actuation state (torque non-transmitting state) of the torque coupling 2. Hereinafter, a direction parallel to the rotation axis line O is referred to as an axial direction.

The torque coupling 2 is configured to include the housing 20 that includes a front housing 21 and a rear housing 22 and that serves as an input rotation member, the inner shaft 23 that is supported such that relative rotation can be performed coaxially with the housing 20 and that serves as an output rotation member, a main clutch 3 that is disposed between the housing 20 and the inner shaft 23 and that serves as a multiple-disc clutch, a cam mechanism 4 that generates a thrust force for pressing the main clutch 3, and an electromagnetic clutch mechanism 5 that receives supply of the electric current from the control device 7 and that actuates the cam mechanism 4. The cam mechanism 4 and the electromagnetic clutch mechanism 5 constitute a pressing mechanism 6 that presses the main clutch 3 at a pressing force depending on the electric current supplied from the control device 7.

The housing 20 encloses a lubricant that lubricates the main clutch 3 and other parts within the housing 20. The main clutch 3 is a wet multiple-disc clutch including a plurality of clutch plates among which frictional sliding is lubricated by the lubricant.

The front housing 21 integrally includes a cylinder part 21a having a cylindrical shape and a bottom part 21b, and has a bottomed cylindrical shape. A female thread 21c is formed on an inner surface of an open end portion of the cylinder part 21a. The propeller shaft 14 (see FIG. 1) is coupled to the bottom part 21b of the front housing 21, for example, through a cross joint. Further, the front housing 21 includes a plurality of outside spline projections 211 extending in the axial direction, on an inner circumferential surface of the cylinder part 21a.

The rear housing 22 includes a first ring-shaped member 221 that is composed of a magnetic material such as iron, a second ring-shaped member 222 that is composed of a nonmagnetic material such as an austenite stainless steel and that is integrally connected to an inner circumference side of the first ring-shaped member 221 by welding or the like, and a third ring-shaped member 223 that is composed of a magnetic material such as iron and that is integrally connected to an inner circumference side of the second ring-shaped member 222 by welding or the like. A ring-shaped containing space 22a that contains an electromagnetic coil 53 is formed between the first ring-shaped member 221 and the third ring-shaped member 223. Further, a male thread 221a that is screwed in the female thread 21c of the front housing 21 is formed on an outer circumferential surface of the first ring-shaped member 221.

The inner shaft 23 is formed in a cylindrical shape, and is supported on an inner circumference of the housing 20 by a ball bearing 24 and a needle roller bearing 25. The inner shaft 23 includes a plurality of inside spline projections 231 extending in the axial direction, on an outer circumferential surface of the inner shaft 23. Further, a spline fitting part 232 in which one end portion of the pinion gear shaft 150 (see FIG. 1) is fitted such that relative rotation cannot be performed is formed on an inner circumferential surface of one end portion of the inner shaft 23.

The main clutch 3 includes a plurality of main outer clutch plates 31 and a plurality of main inner clutch plates 32. The main outer clutch plates 31 and the main inner clutch plates 32 are alternately disposed along the axial direction. The frictional sliding between the main outer clutch plates 31 and the main inner clutch plates 32 is lubricated by the lubricant. The main outer clutch plates 31 rotate together with the front housing 21, and the main inner clutch plates 32 rotate together with the inner shaft 23. The main outer clutch plates 31 are composed of metal, and include a plurality of engagement projections 311 that engages with the outside spline projections 211 of the front housing 21, at end portions of outer circumferences of the main outer clutch plates 31. When the engagement projections 311 engage with the outside spline projections 211, the relative rotation of the main outer clutch plates 31 with the front housing 21 is restricted, and the main outer clutch plates 31 can move in the axial direction, relative to the front housing 21.

The main inner clutch plates 32 include a plurality of engagement projections 321 that engages with the inside spline projections 231 of the inner shaft 23, at end portions of inner circumferences of the main inner clutch plates 32. When the engagement projections 321 engage with the inside spline projections 231, the relative rotation of the main inner clutch plates 32 with the inner shaft 23 is restricted, and the main inner clutch plates 32 can move in the axial direction, relative to the inner shaft 23. Each of the main inner clutch plates 32 includes a discoidal base material 331 that is composed of metal and porous friction materials 332 that are bonded to both side surfaces of the base material 331. On the base material 331, a plurality of oil holes 333 through which the lubricant flows is formed on the inside of the portion where the friction materials 332 are bonded. In each of the main inner clutch plates 32, unillustrated oil grooves through which the lubricant flows are formed on surface contacting with the friction materials 332.

The cam mechanism 4 is configured to include a pilot cam 41 that receives a rotation force of the housing 20 through the electromagnetic clutch mechanism 5, a main cam 42 as a pressing member that presses the main clutch 3 in the axial direction, and a plurality of spherical cam bowls 43 that is disposed between the pilot cam 41 and the main cam 42.

The main cam 42 integrally includes a ring plate-shaped pressing part 421 that contacts with the main inner clutch plate 32 at one end of the main clutch 3 and that presses the main clutch 3, and a cam part 422 that is provided so as to be closer to an inner circumference of the main cam 42 than the pressing part 421 is. An oil hole 420 through which the lubricant flows is formed so as to pass through the pressing part 421 in the axial direction. A spline engagement part 421a formed at an end portion of an inner circumference of the pressing part 421 engages with the inside spline projection 231 of the inner shaft 23, so that the relative rotation of the main cam 42 with the inner shaft 23 is restricted. Further, the main cam 42 is biased by a disc spring 44 that is disposed between the main cam 42 and a stepped surface 23a formed on the inner shaft 23, such that the main cam 42 is away from the main clutch 3 in the axial direction.

The pilot cam 41 includes a spline projection 411 that receives the rotation force of the rotation relative to the main cam 42 from the electromagnetic clutch mechanism 5, at an end portion of an outer circumference of the pilot cam 41. A thrust needle roller bearing 45 is disposed between the pilot cam 41 and the third ring-shaped member 223 of the rear housing 22. A plurality of circumferential cam grooves 41a having different axial depths and a plurality of circumferential cam grooves 422a having different axial depths are formed on facing surfaces of the pilot cam 41 and the cam part 422 of the main cam 42. The cam bowl 43 is disposed between the cam grooves 41a of the pilot cam 41 and the cam grooves 422a of the main cam 42.

By the rotation of the pilot cam 41 relative to the main cam 42, the cam mechanism 4 generates the pressing force for pressing the main clutch 3. In the main clutch 3, the pressing force from the cam mechanism 4 results in frictional contact between the main outer clutch plate 31 and the main inner clutch plate 32, and the driving force is transmitted from the housing 20 to the inner shaft 23 by a frictional force between both plates.

The electromagnetic clutch mechanism 5 is configured to include an armature 50, a plurality of pilot outer clutch plates 51, a plurality of pilot inner clutch plates 52, the electromagnetic coil 53, and a ring-shaped yoke 54 that is composed of a magnetic material and that holds the electromagnetic coil 53. The electromagnetic coil 53 is contained in the containing space 22a of the rear housing 22 while being held by the yoke 54. The yoke 54 is supported by the third ring-shaped member 223 of the rear housing 22 with a ball bearing 26.

The electric current from the control device 7 is supplied to the electromagnetic coil 53 through an electric cable 531, as excitation current. By energization of the electromagnetic coil 53, a magnetic flux having a magnetic flux density depending on the magnitude of the excitation current is generated in a magnetic path G that includes the yoke 54, the first ring-shaped member 221 and the third ring-shaped member 223 of the rear housing 22, the pilot outer clutch plates 51, the pilot inner clutch plates 52 and the armature 50.

The pilot outer clutch plates 51 and the pilot inner clutch plates 52, each of which is a discoidal member composed of a magnetic material such as iron, are alternately disposed along the axial direction between the armature 50 and the rear housing 22. On the pilot outer clutch plates 51 and the pilot inner clutch plate 52, a plurality of arc slits for preventing a short circuit of the magnetic flux is formed at positions that allow the arc slits and the second ring-shaped member 222 of the rear housing 22 to be arrayed along the axial direction.

The pilot outer clutch plates 51 include a plurality of engagement projections 511 that engages with the outside spline projections 211 of the front housing 21, at end portions of outer circumferences of the pilot outer clutch plates 51. The pilot inner clutch plates 52 include a plurality of engagement projections 521 that engages with the spline projection 411 of the pilot cam 41, at end portions of inner circumferences of the pilot inner clutch plates 52. The frictional sliding between the pilot outer clutch plates 51 and the pilot inner clutch plates 52 is lubricated by the lubricant, similarly to the main clutch 3.

The armature 50 is a ring-shaped member that is composed of a magnetic material such as iron, and a plurality of engagement projections 501 that engages with the outside spline projections 211 of the front housing 21 is formed on an outer circumference of the armature 50. Thereby, the armature 50 can move in the axial direction relative to the front housing 21, and the rotation relative to the front housing 21 is restricted.

The electromagnetic clutch mechanism 5 attracts the armature 50 to the yoke 54 side, using a magnetic force generated by the energization of the electromagnetic coil 53, and the movement of the armature 50 generates a frictional force between the pilot outer clutch plates 51 and the pilot inner clutch plates 52. The pilot outer clutch plates 51 and the pilot inner clutch plates 52 perform frictional contact while being pushed to the rear housing 22 side by the armature 50.

In the torque coupling 2, by the actuation of the electromagnetic clutch mechanism 5, a rotation force depending on the electric current supplied to the electromagnetic coil 53 is transmitted to the pilot cam 41, the pilot cam 41 rotates relative to the main cam 42, and the cam bowl 43 rolls on the cam grooves 41a, 422a. Then, the rolling of the cam bowl 43 generates the thrust force for pressing the main clutch 3 to the main cam 42, and generates the frictional force between the main outer clutch plates 31 and the main inner clutch plates 32.

Configuration of Control Device

As shown in FIG. 1, the control device 7 includes a control unit 70 that includes a CPU (arithmetic processing unit), a storage unit 8 that stores programs to be executed by the CPU of the control unit 70, and the like, and a current supply circuit 9 that supplies the electric current to the electromagnetic coil 53 of the torque coupling 2 by switching the voltage of a direct-current power source such as a battery. The current supply circuit 9 includes a switching element such as a transistor, and generates the electric current to be supplied to the electromagnetic coil 53, by switching the direct-current voltage based on a pulse width modulation (PWM) signal that is output from the control unit 70.

By the execution of programs stored in the storage unit 8 by the CPU, the control unit 70 functions as: a torque command value computation unit 71 that computes a torque command value as a driving force that needs to be transmitted by the main clutch 3, based on the vehicle state; a current command value computation unit 72 that computes a current command value corresponding to the torque command value; a current correction unit 73 that corrects the current command value; a current control unit 74 that controls the current supply circuit 9 such that an electric current depending on the current command value corrected by the current correction unit 73 is supplied to the pressing mechanism 6. Some or all of the functions of the torque command value computation unit 71, the current command value computation unit 72, the current correction unit 73 and the current control unit 74 may be realized by hardware such as an ASIC and an FPGA.

Figure 3:
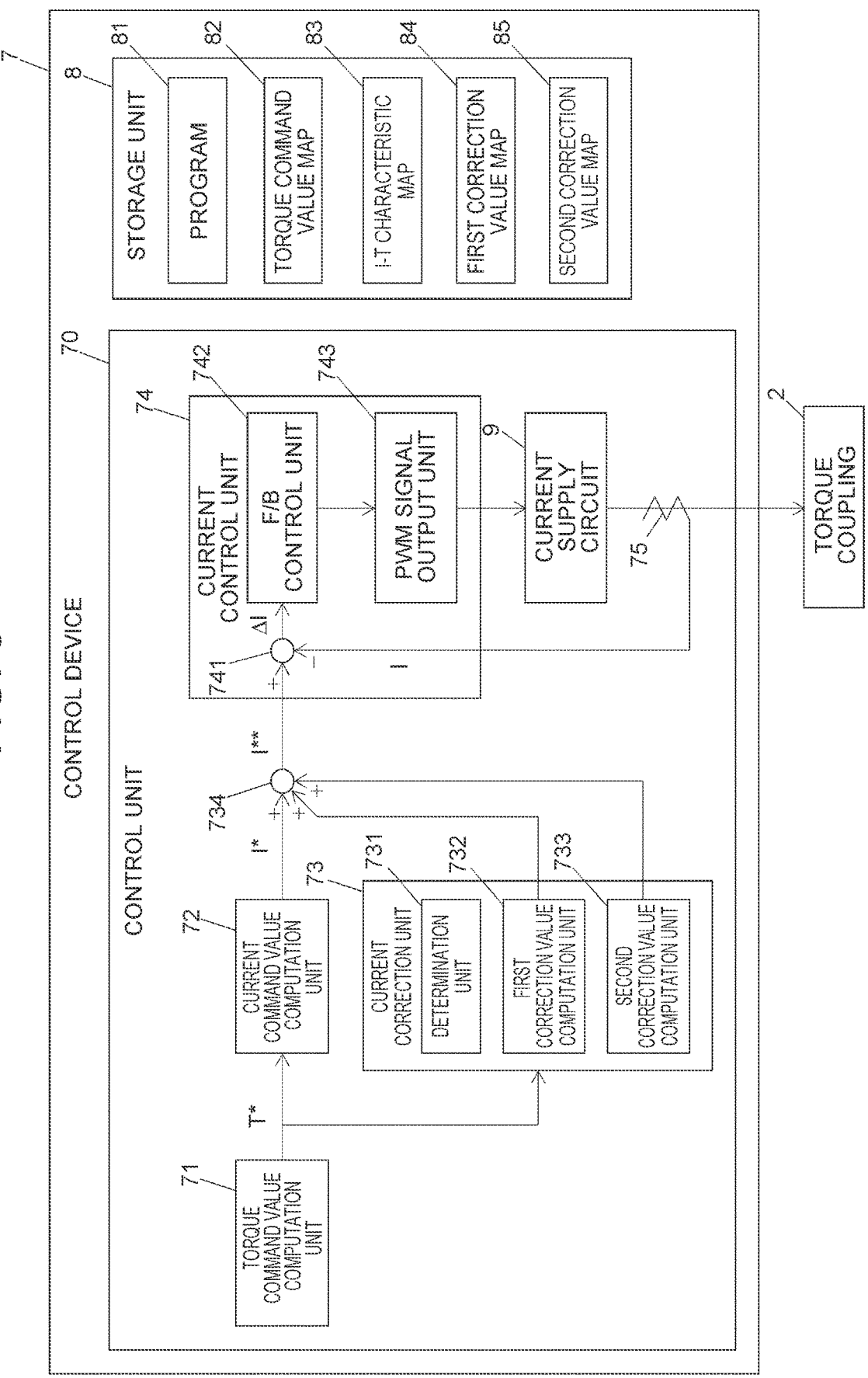
FIG. 3 is a control block diagram showing an example of a control configuration of the control device.

FIG. 3 is a control block diagram showing an example of a control configuration of the control device 7. In addition to a program 81 that is executed by the CPU of the control unit 70, the storage unit 8 stores a torque command value map 82, an I-T characteristic map 83, a first correction value map 84 and a second correction value map 85, in a non-volatile memory.

The torque command value computation unit 71 refers to the torque command value map 82 based on the vehicle state, and computes a torque command value T*. For example, the torque command value map 82 defines a relation of a front-rear wheel differential rotation speed that is the difference between an average rotation speed of the left and right front wheels 181, 182 and an average rotation speed of the left and right rear wheels 191, 192 and a first command torque component, a relation of the press amount of the accelerator pedal, a vehicle speed and a second command torque component, and a relation of the steering angle, the vehicle speed and a third command torque component. The torque command value computation unit 71 computes the total value of the first to third torque components, as the torque command value T*.

The current command value computation unit 72 refers to the I-T characteristic map 83, and computes a current command value I* corresponding to the torque command value T*. In the I-T characteristic map 83, a result of an operation test that is performed after assembly of the torque coupling 2 at the time of production of the driving force transmission device 1 is stored. In the operation test, the driving force (torque) that is transmitted from the housing 20 to the inner shaft 23 is measured, while the electric current to be supplied to the electromagnetic coil 53 is changed from zero to the maximum at a constant time change rate (change amount of the electric current per unit time). Hereinafter, a time during which the electric current to be supplied to the electromagnetic coil 53 is changed from zero to the maximum at the time of the operation test is referred to as an I-T characteristic measurement time. For example, the I-T characteristic measurement time is 5 seconds. Further, hereinafter, the change rate means the change amount per unit time, and the change rate of the electric current at the time of the operation test is referred to as a reference change rate.

Figure 4:
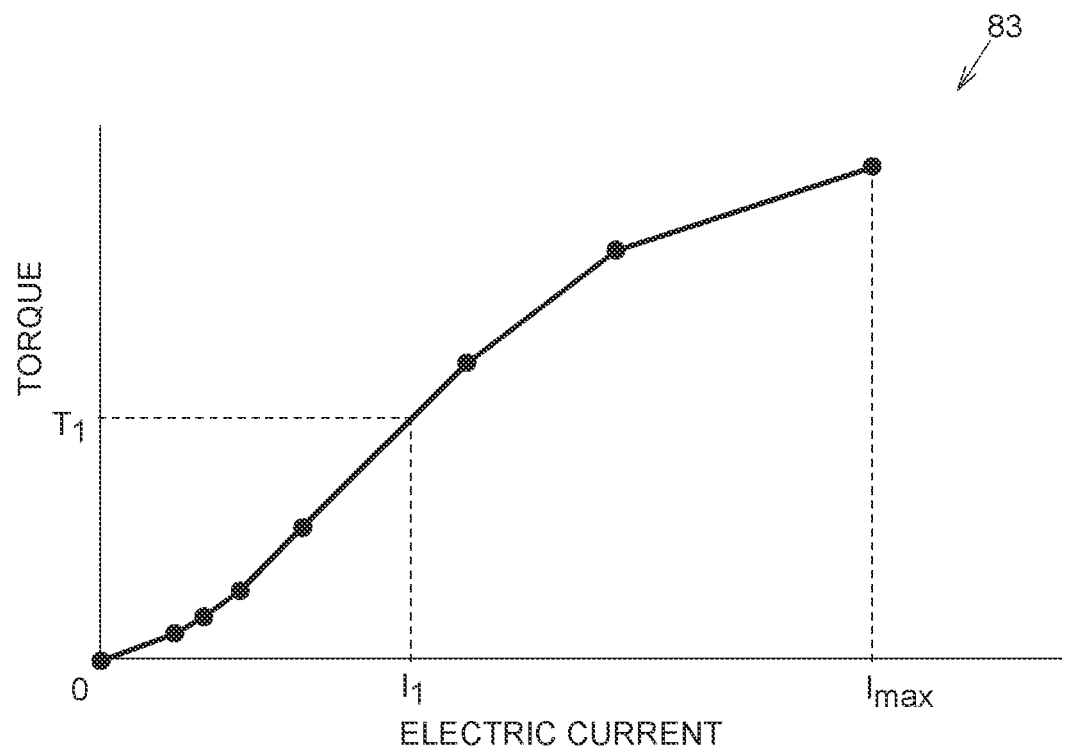
FIG. 4 is a graph showing an example of an I-T characteristic map.

FIG. 4 is a graph showing an example of the I-T characteristic map 83. The I-T characteristic map 83 is stored in the storage unit 8 at the time of production of the driving force transmission device 1. In the I-T characteristic map 83, a plurality of coordinate points shown in FIG. 4 is registered in a two-dimensional coordinate system. The current command value computation unit 72 performs linear interpolation among the coordinate points, and computes the current command value I* corresponding to the torque command value T*. Imax on the abscissa axis represents the maximum of the electric current of the electromagnetic coil 53 in the operation test. For example, in the case where the torque command value T* is $T_1$ on the ordinate axis in the graph of FIG. 4, the current command value computation unit 72 calculates $I_1$, which is a value on the abscissa axis that corresponds to $T_1$, as the current command value I*.

The current correction unit 73 includes a determination unit 731 that determines whether the current command value I* is corrected and how the correction is performed, based on temporal change in the torque command value T*, a first correction value computation unit 732 that computes a first correction value $C_1$ based on the first correction value map 84, a second correction value computation unit 733 that computes a second correction value $C_2$ based on the second correction value map 85, and an adder 734 that computes a correction current command value I** by adding the first correction value $C_1$ and the second correction value $C_2$ to the current command value I*. Details of the process by the current correction unit 73 will be described later.

The current control unit 74 includes a subtractor 741, a F/B (feedback) control unit 742, and a PWM signal output unit 743. To the subtractor 741, the correction current command value I is input, and an actual current value I detected by a current sensor 75 is input. The current sensor 75 detects the electric current that is supplied to the electromagnetic coil 53. The subtractor 741 calculates a current difference ΔI between the correction current command value I and the actual current value I, and outputs the calculated current difference ΔI to the F/B control unit 742.

The F/B control unit 742 calculates a feedback control amount based on the input current difference ΔI, and outputs the feedback control amount to the PWM signal output unit 743. The F/B control unit 742 calculates, as the feedback control amount, the total value of a value resulting from multiplying the current difference ΔI by a predetermined proportional gain and a value resulting from multiplying an integral value of the current difference ΔI by a predetermined integral gain. The PWM signal output unit 743 performs a PWM computation depending on the feedback control amount, and outputs a PWM signal having a duty ratio depending on the feedback control amount, to the current supply circuit 9.

In a non-energization state where the electric current from the current supply circuit 9 is not supplied to the electromagnetic coil 53, the main cam 42 of the cam mechanism 4 is away from the main clutch 3 by the biasing force of the disc spring 44, and the lubricant is interposed between the main outer clutch plates 31 and the main inner clutch plates 32. When the electromagnetic coil 53 is energized in this state, the main clutch 3 is pressed to the main cam 42. Then, the lubricant between the main outer clutch plates 31 and the main inner clutch plates 32 is gradually discharged, and the main outer clutch plates 31 and the main inner clutch plates 32 make contact with each other, so that the frictional force is generated.

The current command value computation unit 72 computes the current command value I*, by referring to the I-T characteristic map 83 set based on the result when the electric current to be supplied to the electromagnetic coil 53 is changed from zero to the maximum during the I-T characteristic measurement time. Therefore, in the case where the change rate of the electric current when the electric current to be supplied to the electromagnetic coil 53 is increased is higher than the reference change rate, a larger amount of the lubricant remains between the main outer clutch plates 31 and the main inner clutch plates 32 than that at the time of the operation test, at each current value, so that the torque to be transmitted by the main clutch 3 tends to be lower than that at the time of the operation test. Conversely, in the case where the change rate of the electric current when the electric current to be supplied to the electromagnetic coil 53 is increased is lower than the reference change rate, a smaller amount of the lubricant is interposed between the main outer clutch plates 31 and the main inner clutch plates 32 than that at the time of the operation test, at each current value, so that the torque to be transmitted by the main clutch 3 tends to be higher than that at the time of the operation test.

Further, in the case where the change rate of the electric current when the electric current to be supplied to the electromagnetic coil 53 is decreased is higher than the reference change rate, it is harder for the lubricant to flow into gaps between the main outer clutch plates 31 and the main inner clutch plates 32 than at the time of the operation test, at each current value, so that the torque to be transmitted by the main clutch 3 tends to be higher than that at the time of the operation test. Conversely, in the case where the change rate of the electric current when the electric current to be supplied to the electromagnetic coil 53 is decreased is lower than the reference change rate, a larger amount of the lubricant flows into the gaps between the main outer clutch plates 31 and the main inner clutch plates 32 than that at the time of the operation test, at each current value, so that the torque to be transmitted by the main clutch 3 tends to be lower than that at the time of the operation test.

Figure 5:
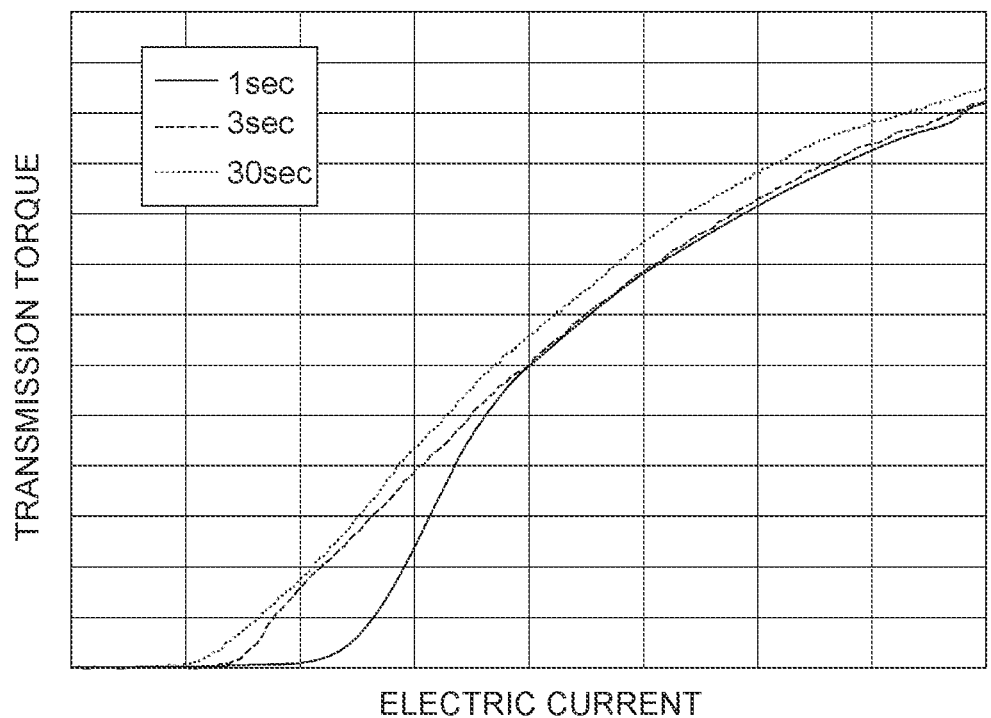
FIG. 5 is a graph showing changes in a transmission torque of a main clutch when an electric current to be supplied to an electromagnetic coil is changed at constant change rates.

FIG. 5 is a graph showing changes in the transmission torque (actual torque) of the main clutch 3 when the electric current to be supplied to the electromagnetic coil 53 is changed from zero to the maximum at constant change rates. The graph shows relations between the excitation current of the electromagnetic coil 53 and the transmission torque of the main clutch 3 when the time (sweep time) during which the electric current to be supplied to the electromagnetic coil 53 is changed from zero to the maximum is 1 second, 3 seconds and 30 seconds. For example, in the case where the sweep time is 1 second, the electric current to be supplied to the electromagnetic coil 53 is changed from zero to the maximum at a constant change rate for 1 second.

As shown in the graph of FIG. 5, as the sweep time is shorter, the discharge of the lubricant from the main clutch 3 is later and the torque that is actually transmitted is lower, at the time of the increase in the electric current. In this way, when the sweep time is shorter than the I-T characteristic measurement time, that is, when the electric current to be supplied to the electromagnetic coil 53 is higher than the reference change rate, the transmission torque of the main clutch 3 is lower than the characteristic shown in the I-T characteristic map 83 at the time of the increase in the electric current, and the transmission torque of the main clutch 3 is higher than the characteristic shown in the I-T characteristic map 83 at the time of the decrease in the electric current. Further, when the sweep time is longer than the I-T characteristic measurement time, that is, when the electric current to be supplied to the electromagnetic coil 53 is lower than the reference change rate, the transmission torque of the main clutch 3 is higher than the characteristic shown in the I-T characteristic map 83 at the time of the increase in the electric current, and the transmission torque of the main clutch 3 is lower than the characteristic shown in the I-T characteristic map 83 at the time of the decrease in the electric current.

The inventors have found that the transmission torque of the main clutch 3 when the torque command value T* becomes constant after the change gently changes after the torque command value T* becomes constant, even when the electric current to be supplied to the electromagnetic coil 53 is constant. Specifically, for example, when the torque command value T* gradually increases from zero and becomes a constant value, the transmission torque of the main clutch 3 gradually increases even when the electric current to be supplied to the electromagnetic coil 53 is constant. Further, when the torque command value T* gradually decreases and becomes a constant value, the transmission torque of the main clutch 3 gradually decreases even when the electric current to be supplied to the electromagnetic coil 53 is constant.

Figure 6A:
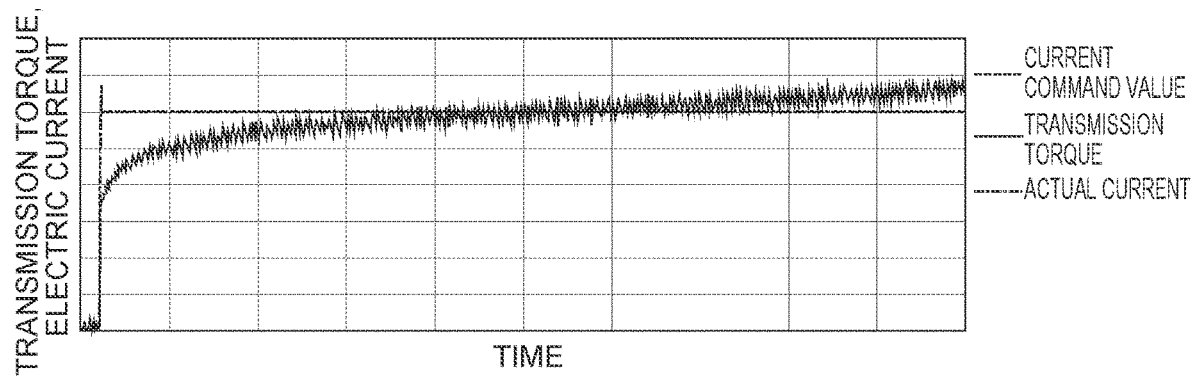
FIG. 6A is a graph showing changes in an actual current value and the transmission torque of the main clutch when a current command value increases from zero in a stepwise manner.
Figure 6B:
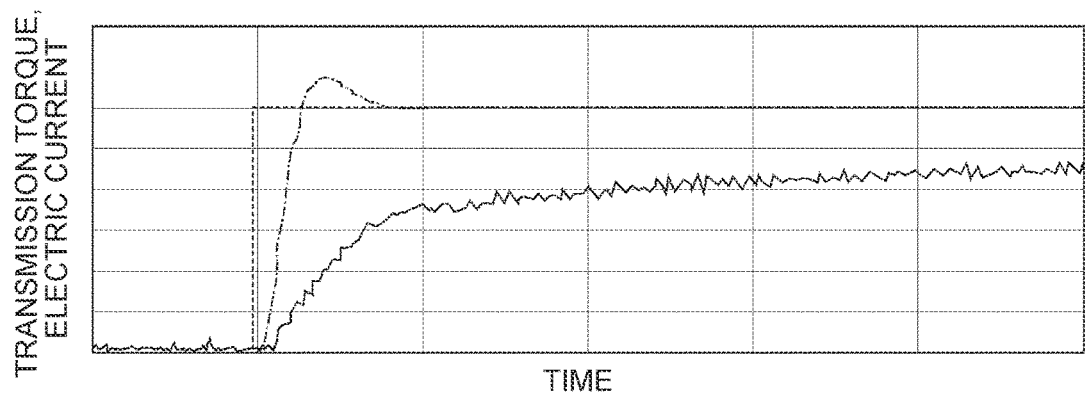
FIG. 6B is an enlarged view showing a part of the graph of FIG. 6A.

FIG. 6A is a graph showing changes in the actual current value and the transmission torque of the main clutch 3 when the current command value I* increase from zero in a stepwise manner. FIG. 6B is an enlarged view showing a part of the graph of FIG. 6A.

As shown in FIG. 6A and FIG. 6B, when the current command value I* increases from zero in a stepwise manner, the transmission torque of the main clutch 3 rapidly rises up in an early state, and then as the lubricant interposed between the main outer clutch plates 31 and the main inner clutch plates 32 is discharged, the transmission torque of the main clutch 3 gently rises for several seconds.

The phenomenon in which the deviation amount between the transmission torque at the time of the increase in the electric current and the transmission torque at the time of the decrease in the electric current changes depending on the change rate of the electric current as shown in the graph of FIG. 5 and the phenomenon in which the transmission torque of the main clutch 3 gently changes with the change in the amount of the lubricant interposed between the main outer clutch plates 31 and the main inner clutch plates 32 as shown in FIG. 6A and FIG. 6B cause an error of the actual transmission torque with respect to the torque command value T*, and are undesirable. In the embodiment, the generation of the error of the transmission torque due to the phenomena is restrained by the following control method.

Figure 7:
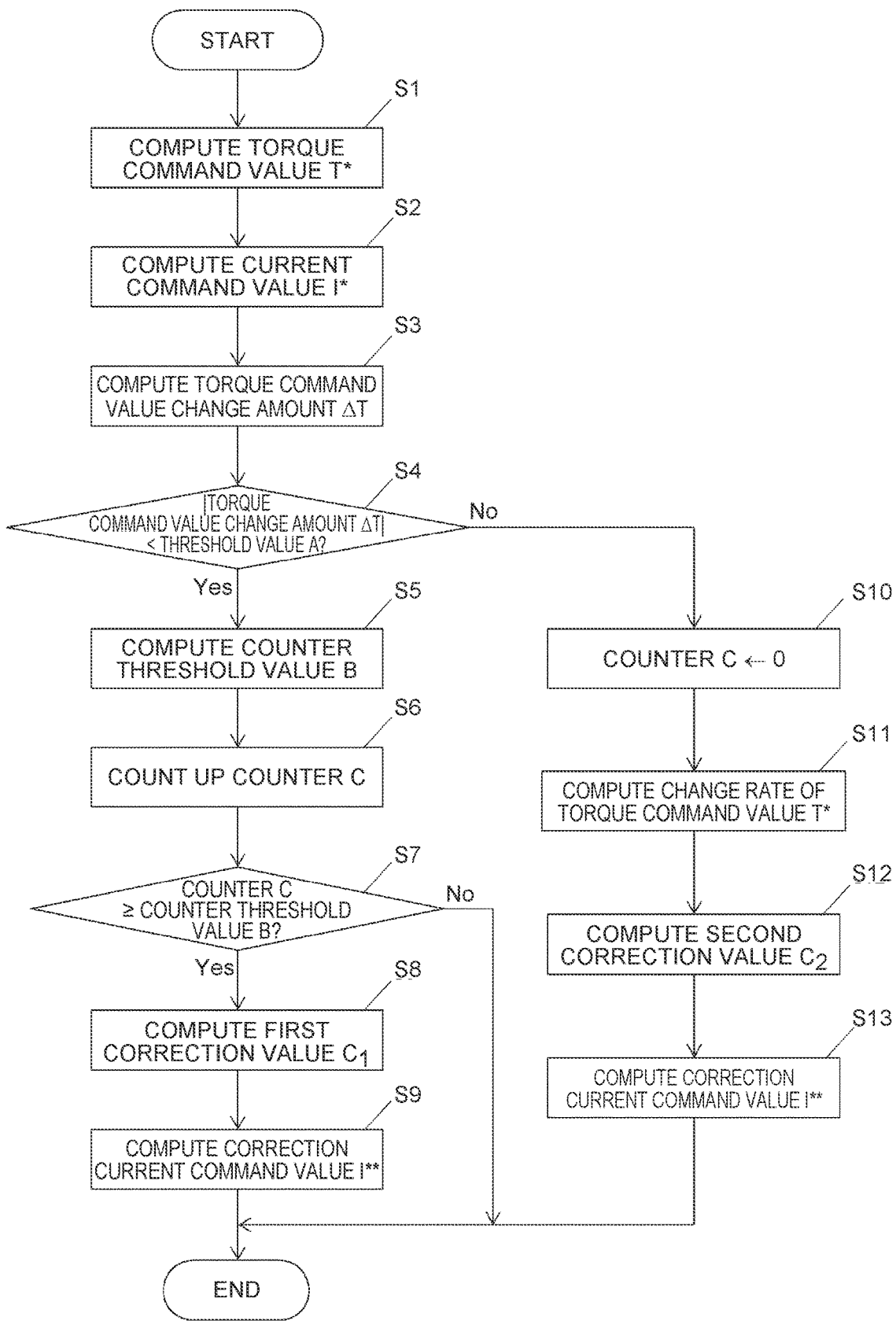
FIG. 7 is a flowchart showing an example of a procedure of a process that is executed by a control unit.

FIG. 7 is a flowchart showing an example of a procedure of a process by which the control unit 70 calculates the correction current command value I**. The control unit 70 executes each process in the flowchart, in a predetermined computation cycle (for example, 5 ms).

In the process in the flowchart shown in FIG. 7, the control unit 70 refers to the torque command value map 82 based on the vehicle state, and computes the torque command value T* (step S1). Next, the control unit 70 refers to the I-T characteristic map 83, and computes the current command value I* corresponding to the torque command value T* (step S2). The process of step S1 is a process that is executed by the torque command value computation unit 71, and the process of step S2 is a process that is executed by the current command value computation unit 72.

Next, the control unit 70 computes a torque command value change amount ΔT that is the difference between the last value of the torque command value T* in the last computation cycle and the present value of the torque command value T* in the present computation cycle (step S3). Next, the control unit 70 determines whether the absolute value of the torque command value change amount ΔT is smaller than a predetermined threshold value A (step S4). The threshold value A is such a small value that the determination result in step S4 is positive (Yes) when the torque command value T* is substantially constant. Hereinafter, a state where the determination result in step S4 is positive (Yes), that is, a state where the change rate of the torque command value T* is in a predetermined range is referred to as a constant-torque state.

In the case where the determination result in step S4 is positive (Yes), the control unit 70 calculates a counter threshold value B that is used in step S7 described later, based on the change rate of the torque command value T* before the determination result in step S4 becomes positive (Yes) (step S5). Next, the control unit 70 counts up a counter C for measuring time (step S6). In the case where the determination result in step S4 is continuously positive (Yes), the process of step S5 may be performed only in the first computation cycle and may be skipped in the subsequent computation cycles.

Next, the control unit 70 determines whether the counter C counted up in step S6 is equal to or larger than the counter threshold value B calculated in step S5 (step S7). In the case where the counter C is equal to or larger than the counter threshold value B as a result of the determination (S7: Yes), the control unit 70 computes the first correction value $C_1$ by referring to the first correction value map 84 based on a detection time T evaluated from the counter C (step S8). The detection time T corresponds to the duration of the constant-torque state, and can be evaluated by multiplying the counter value of the counter C by the computation cycle length. Further, the control unit 70 calculates the correction current command value I** by adding the first correction value $C_1$ to the current command value I* (step S9).

In this way, in the constant-torque state after the torque command value T* changes, the current correction unit 73 corrects the current command value I* by the first correction value $C_1$ depending on the duration of the constant-torque state. When the determination result in step S7 is negative (No), the control unit 70 ends the process in that computation cycle, without the processes of step S8 and step S9.

On the other hand, in the case where the determination result in step S4 is negative (No), the control unit 70 resets the counter C to zero (step S10). Further, the control unit 70 calculates the change rate of the torque command value T* in a predetermined time in the past, as an average value of torque command value change amounts ΔT in a plurality of computation cycles in the past (step S11). For example, when the predetermined time is 20 ms and the computation cycle length is 5 ms, the change rate of the torque command value T* that is calculated in step S11 is an average value of the torque command value change amounts ΔT in the present computation cycle and the past three computation cycles.

Next, the control unit 70 computes the second correction value $C_2$ by referring to the second correction value map 85 based on the change rate of the torque command value T* that is calculated in step S11 (step S12). Then, the control unit 70 calculates the correction current command value I** by adding the second correction value $C_2$ to the current command value I* (step S13).

The processes of step S4 to step S7 and the process of step S10 are processes that are executed by the determination unit 731 of the current correction unit 73. The process of step S8 is a process that is executed by the first correction value computation unit 732 of the current correction unit 73. The process of step S12 is a process that is executed by the second correction value computation unit 733 of the current correction unit 73. The processes of step S9 and step S13 are processes that are executed by the adder 734 of the current correction unit 73.

Here, a method for calculating the counter threshold value B in step S5 will be described in detail. The control unit 70 calculates the counter threshold value B based on the change rate of the torque command value T* in a predetermined time in the past. The predetermined time preferably should be longer than the predetermined time in step S11, and for example, is 1 second or longer. The control unit 70 sets the counter threshold value B to a larger value as the change rate of the torque command value T* in the predetermine time in the past is higher, that is, as the change amount (absolute value) of the torque command value T* in the predetermined time in the past is larger.

This is because the discharge of the lubricant from the gaps between the main outer clutch plates 31 and the main inner clutch plates 32 is not finished in the case where the torque command value T* rapidly increases, and the discharge of the lubricant from the gaps between the main outer clutch plates 31 and the main inner clutch plates 32 proceeds until the torque command value T* becomes constant in the case where the torque command value T* gently increases. Further, at the time of the decrease in the torque command value T*, as the change rate of the torque command value T* is higher, influence of a drag torque due to the viscosity of the lubricant interposed between the main outer clutch plates 31 and the main inner clutch plates 32 continues for a longer time, and therefore, it is necessary to set the counter threshold value B to a larger value.

It is ideal to set the counter threshold value B such that the effect of the correction by the first correction value $C_1$ starts to appear at the time when the transmission torque of the main clutch 3 roughly coincides with the torque command value T*. For example, it is desirable to derive a relation of the change rate of the torque command value T* and an ideal counter threshold value B, from a result of an experiment that is performed while the change rate of the torque command value T* is changed.

In this way, the current correction unit 73 sets the counter threshold value B depending on the change rate of the torque command value T* before the constant-torque state, and starts the correction of the current command value I* by the second correction value $C_2$ after a predetermined time depending on the counter threshold value B elapses from the start of the constant-torque state.

For example, the counter threshold value B may be altered depending on an estimated temperature of the lubricant or a differential rotation speed between the housing 20 and the inner shaft 23. The estimated temperature of the lubricant can be estimated, for example, based on the outside temperature and the load state of torque coupling 2, and the differential rotation speed between the housing 20 and the inner shaft 23 can be evaluated from the front-rear wheel differential rotation speed. The viscosity of the lubricant is higher as the temperature of the lubricant is lower, and therefore it is desirable to decrease the counter threshold value B as the estimated temperature of the lubricant is higher. Further, the lubricant tends to be more smoothly discharged as the differential rotation speed between the housing 20 and the inner shaft 23 is lower, and therefore it is desirable to decrease the counter threshold value B as the differential rotation speed between the housing 20 and the inner shaft 23 is lower.

Figure 8:
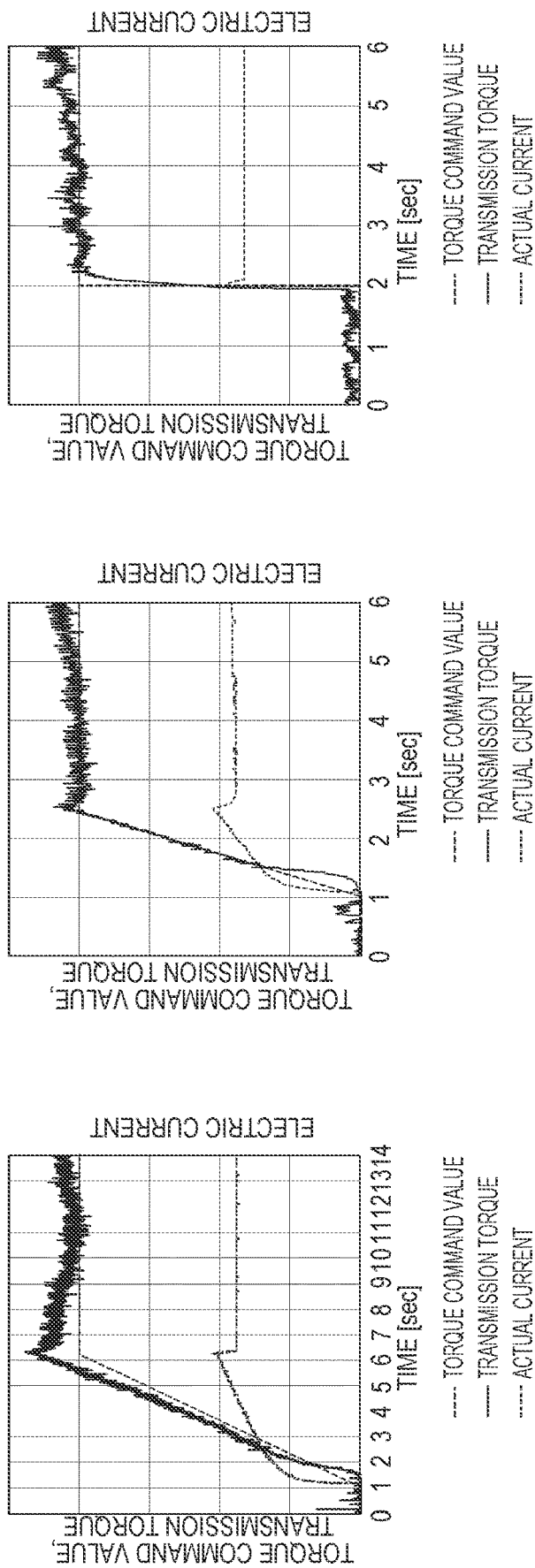
FIG. 8 contains a left diagram, a center diagram and a right diagram that are graphs showing examples of temporal changes in the transmission torque of the main clutch and the current command value when a torque command value becomes constant after the torque command value rises at different change rates.

A left diagram, a center diagram and a right diagram in FIG. 8 are graphs showing examples of temporal changes in the transmission torque of the main clutch 3 and the current command value I* when the torque command value T* becomes constant after the torque command value T* rises at different change rates. The left diagram in FIG. 8 is a graph when the change rate of the torque command value T* is low, the center diagram in FIG. 8 is a graph when the change rate of the torque command value T* is a middle-level change rate, and the right diagram in FIG. 8 is a graph when the torque command value T* rises in a stepwise manner. In the graph of the center diagram in FIG. 8, about 1.5 seconds before the torque command value T* becomes constant, the change rate of the current command value I* is equivalent to the change rate of the electric current that is supplied to the electromagnetic coil 53 at the time of the operation test after the assembly of the torque coupling 2.

As shown in the left diagram in FIG. 8, in the case where the change rate of the torque command value T* is low, the transmission torque of the main clutch 3 is higher than the torque command value T* while the torque command value T* is rising, and the transmission torque of the main clutch 3 is above the torque command value T* even at the time when the torque command value T* becomes constant. In such a case, it is desirable to immediately start the correction process in step S8 and step S9.

As shown in the right diagram in FIG. 8, in the case where the change rate of the torque command value T* is high, the transmission torque of the main clutch 3 does not keep pace with the rise in the torque command value T*, and the transmission torque of the main clutch 3 is below the torque command value T* at the time when the torque command value T* becomes constant. In such a case, it is desirable to delay the start of the correction process in step S8 and step S9.

Figure 9:
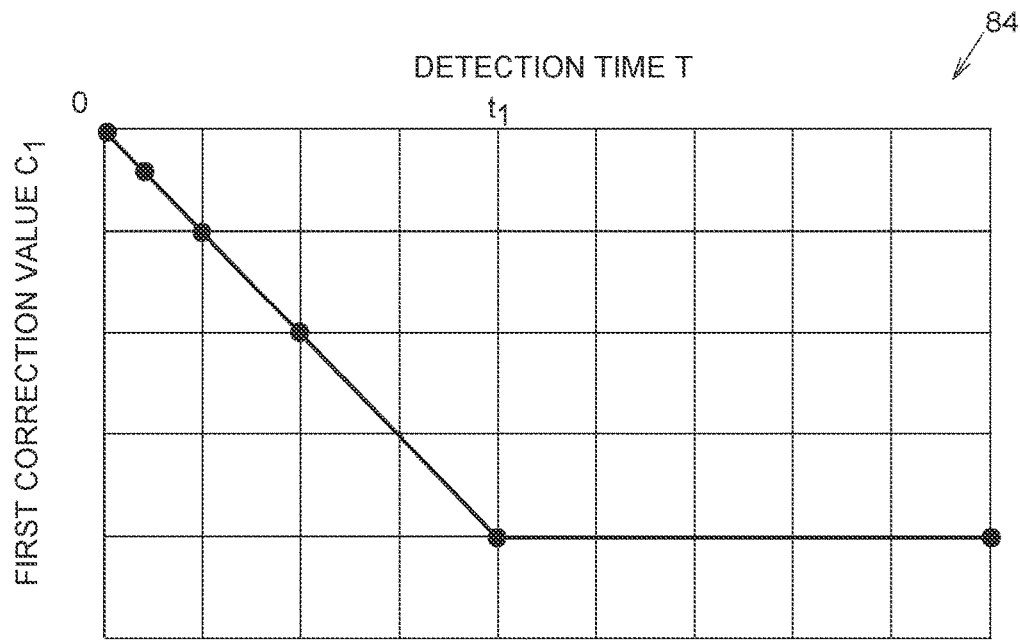
FIG. 9 is a graph showing an example of a first correction value map.

FIG. 9 is a graph showing an example of the first correction value map 84. FIG. 9 illustrates map information to which the control unit 70 refers in the constant-torque state after the torque command value T* rises. As shown in FIG. 9, a characteristic in which the correction amount (absolute value) gradually increases until the detection time T becomes $t_1$ and the correction amount is constant after the detection time T becomes $t_1$ is stored in the first correction value map 84. As shown in FIG. 9, the first correction value $C_1$ in the constant-torque state after the torque command value T* increases is a negative value, and therefore the correction current command value I** becomes smaller than the current command value I* because the first correction value $C_1$ is added to the current command value I* in step S9.

Map information about the first correction value map 84 to which the control unit 70 refers in the constant-torque state after the torque command value T* decreases is, for example, map information in which the sign of the correction value in the map information shown in FIG. 9 is inverted. The absolute value of the correction amount may be changed, and the time ($t_1$ in FIG. 9) when the correction amount becomes constant may be changed. The first correction value $C_1$ in this case is a positive value, and therefore the correction current command value I** becomes larger than the current command value I* because the first correction value $C_1$ is added to the current command value I* in step S9.

In this way, in the constant-torque state after the torque command value T* increases, the current correction unit 73 performs the correction so as to gradually decrease the current command value I* by the first correction value $C_1$ depending on the duration of the constant-torque state. Further, in the constant-torque state after the torque command value T* decreases, the current correction unit 73 performs the correction so as to gradually increase the current command value I* by the first correction value $C_1$ depending on the duration of the constant-torque state.

Figure 10:
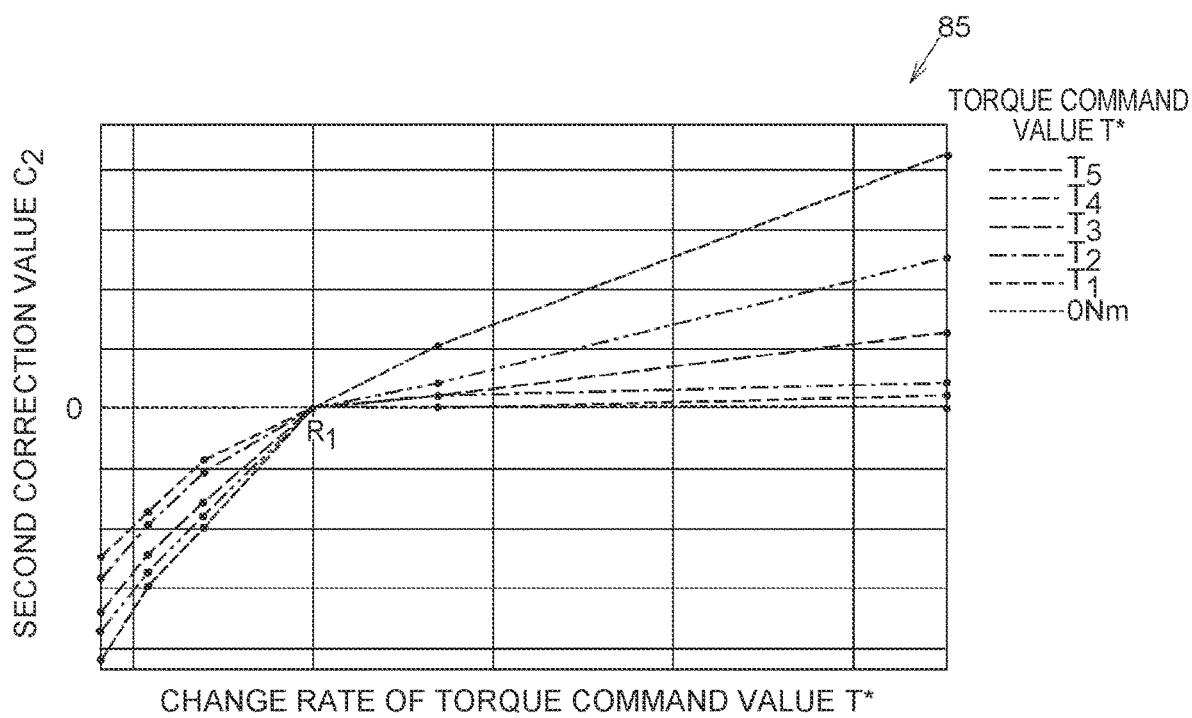
FIG. 10 is a graph showing an example of a second correction value map.

FIG. 10 is a graph showing an example of the second correction value map 85. The second correction value map 85 is an example of relation information indicating a relation of the change rate of the torque command value T* and the second correction value $C_2$. In the second correction value map 85, the relation of the change rate of the torque command value T* computed in step S11 and the second correction value $C_2$ is defined for each of magnitudes (0 Nm and $T_1$ to $T_5$ ($0<T_1<T_2<T_3<T_4<T_5$)) of the torque command value T*. As the change rate of the torque command value T* that is used as the abscissa axis of the graph, an average value of torque command value change amounts ΔT in a plurality of computation cycles in the past may be used, or the torque command value change amount ΔT that is the difference between the torque command value T* in the last computation cycle and the torque command value T* in the present computation cycle may be used.

In FIG. 10, $R_1$ on the abscissa axis indicates the reference change rate. The second correction value $C_2$ indicated by the ordinate axis is a positive value when the change rate of the torque command value T* indicated by the abscissa axis is higher than the reference change rate, and is a negative value when the change rate of the torque command value T* is lower than the reference change rate. In this way, when the change rate of the torque command value T* is higher than the reference change rate at the time of the rise in the torque command value T*, the current correction unit 73 adds the second correction value $C_2$ to the current command value I*, and thereby sets the correction current command value I** to a value larger than the current command value I*. That is, the current correction unit 73 performs the correction so as to increase the current command value. Further, when the change rate of the torque command value T* is lower than the reference change rate at the time of the rise in the torque command value T*, the current correction unit 73 adds the second correction value $C_2$ having a negative value to the current command value I*, and thereby sets the correction current value I** to a value smaller than the current command value I*. That is, the current correction unit 73 performs the correction so as to decrease the current command value.

As shown in FIG. 10, the magnitude (absolute value) of the second correction value $C_2$ is larger as the deviation (difference) between the change rate of the torque command value T* and the reference change rate is larger. Further, when the change rate of the torque command value T* is lower than the reference change rate, the slope of the graph shown in FIG. 10 is larger compared to when the change rate of the torque command value T* is higher than the reference change rate. That is, the change amount of the absolute value of the second correction value $C_2$ with respect to the change amount of the magnitude of the torque command value T* is larger.

Further, at the time of the fall in the torque command value T*, the current correction unit 73 performs the correction of the current command value I* using a value resulting from reversing the sign of the second correction value $C_2$ on the ordinate axis shown in FIG. 10. That is, the second correction value $C_2$ at the time of the rise in the torque command value T* shown in the second correction value map 85 and the second correction value $C_2$ at the time of the fall in the torque command value T* are values that are different only in sign.

In this way, when the change amount of the torque command value T* is larger than the threshold value A at the time of the rise in the torque command value T*, the current correction unit 73 performs the correction so as to increase the current command value I* by the correction amount depending on the change rate of the torque command value T*. Further, when the change amount of the torque command value T* is larger than the threshold value A at the time of the fall in the torque command value T*, the current correction unit 73 performs the correction so as to decrease the current command value I* by the correction amount depending on the change rate of the torque command value T*. Furthermore, the current correction unit 73 refers to the second correction value map 85, and increases the correction amount of the current command value I* as the change rate of the torque command value T* is higher.

Figure 11A:
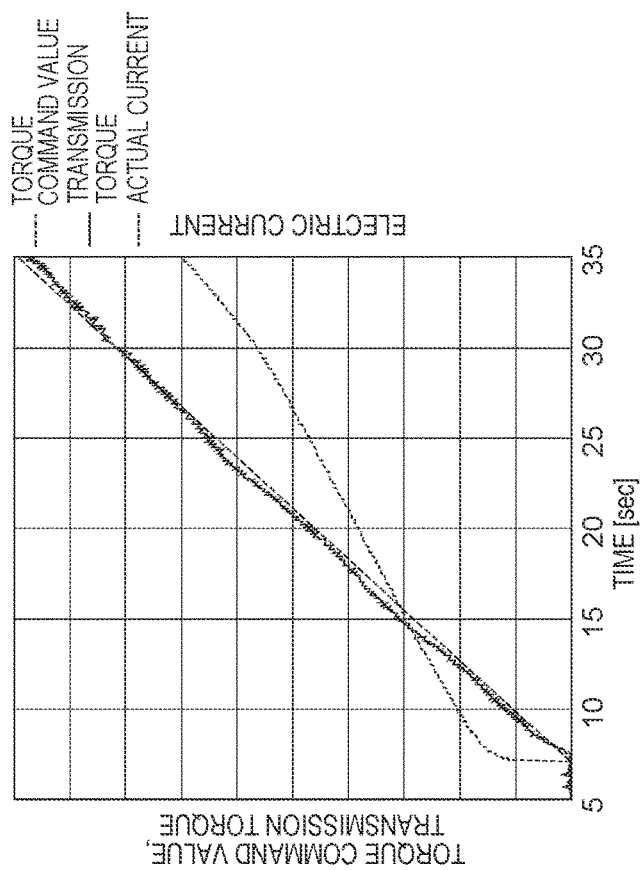
FIG. 11A is a graph showing examples of temporal changes in the transmission torque of the main clutch and the current command value during rise in the torque command value, and shows a case where a correction is not performed.
Figure 11B:
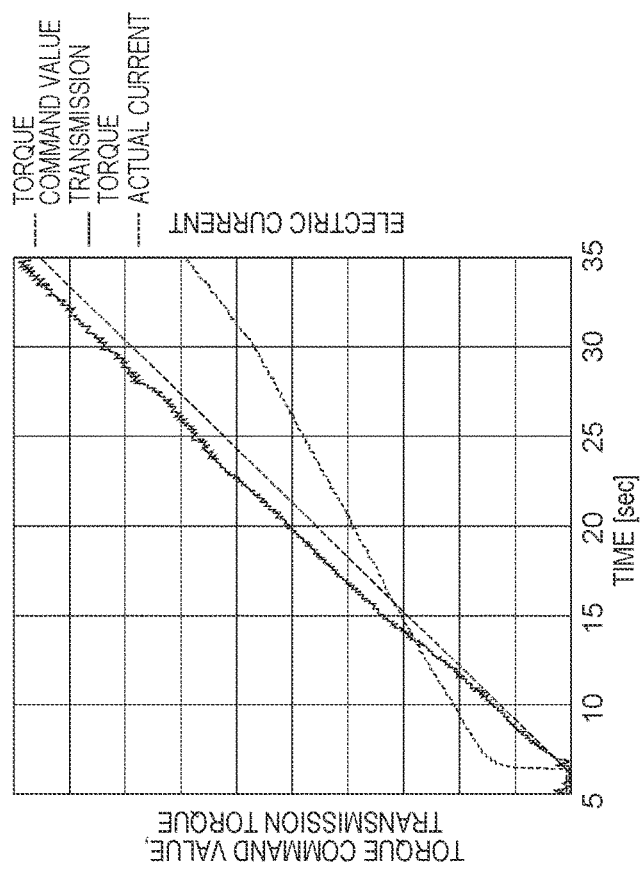
FIG. 11B is a graph showing examples of temporal changes in the transmission torque of the main clutch and the current command value during rise in the torque command value, and shows a case where the correction is performed.

Each of FIG. 11A and FIG. 11B is a graph showing examples of temporal changes in the transmission torque of the main clutch 3 and the current command value I* during the rise in the torque command value T*. FIG. 11A shows a case where the correction by the second correction value $C_2$ is not performed, and FIG. 11B shows a case where the correction by the second correction value $C_2$ is performed. As shown in FIG. 11A, when the change rate of the torque command value T* is low, the transmission torque of the main clutch 3 is larger than the torque command value T*, but as shown in FIG. 11B, the difference between the transmission torque of the main clutch 3 and the torque command value T* is reduced by the correction by the second correction value $C_2$.

As the first correction value $C_1$ shown in the first correction value map 84 and the second correction value $C_2$ shown in the second correction value map 85, the first correction value $C_1$ and the second correction value $C_2$ that are previously set and stored in the storage unit 8 may be used with no change, or may be altered, for example, based on the magnitude of the torque command value T*, the differential rotation speed between the housing 20 and the inner shaft 23, or the estimated temperature of the lubricant. In this case, it is desirable to increase the magnitudes (absolute values) of the first correction value $C_1$ and the second correction value $C_2$, as the torque command value T* is larger, as the differential rotation speed between the housing 20 and the inner shaft 23 is larger, or as the estimated temperature of the lubricant is lower.

Effect of Embodiment

With the embodiment of the disclosure described above, it is possible to reduce the difference between the torque command value T* and the transmission torque of the main clutch 3 at the time of the rise and fall in the torque command value T*, and to enhance the accuracy of the transmission torque of the main clutch 3.

Supplement

The disclosure has been described above based on the embodiment. The embodiment does not limit the disclosure according to the claims. Note that all combinations of the characteristics described in the embodiment are not necessarily essential in means for solving the problem for the disclosure.

The disclosure can be carried out while being appropriately modified without departing from the spirit of the disclosure. For example, the configuration of the four-wheel-drive vehicle 100 is not limited to the configuration exemplified in FIG. 1, and the disclosure can be applied to four-wheel-drive vehicles and others having various configurations.

What is claimed is:

1. A driving force transmission device comprising:
an input rotation member and an output rotation member that are configured to perform relative rotation coaxially;
a multiple-disc clutch that includes a plurality of clutch plates among which frictional sliding is lubricated by a lubricant;
a pressing mechanism that is configured to press the multiple-disc clutch at a pressing force depending on an electric current that is supplied; and
a control device that includes a current supply circuit configured to supply the electric current to the pressing mechanism, wherein the output rotation member being configured such that a driving force of a vehicle is transmitted from the input rotation member to the output rotation member by the multiple-disc clutch,
the control device being configured to compute a torque command value based on a state of the vehicle, the torque command value being the driving force that needs to be transmitted by the multiple-disc clutch,
the control device being configured to compute a current command value corresponding to the torque command value, being configured to correct the current command value, and being configured to control the current supply circuit such that the electric current depending on the current command value corrected by the control device is supplied to the pressing mechanism, and
the control device being configured to correct the current command value so as to increase or decrease the current command value by a correction amount depending on a change rate of the torque command value.

2. The driving force transmission device according to claim 1, wherein:
the control device is configured to increase the current command value when the change rate of the torque command value is higher than a reference change rate at a time of rise in the torque command value; and
the control device is configured to decrease the current command value when the change rate of the torque command value is lower than the reference change rate at the time of the rise in the torque command value.

3. The driving force transmission device according to claim 1, wherein:
the control device is configured to decrease the current command value when the change rate of the torque command value is higher than a reference change rate at a time of fall in the torque command value; and
the control device is configured to increase the current command value when the change rate of the torque command value is lower than the reference change rate at the time of the fall in the torque command value.

4. The driving force transmission device according to claim 2, wherein the control device is configured to increase the correction amount as a deviation between the change rate of the torque command value and the reference change rate is larger.

5. The driving force transmission device according to claim 3, wherein the control device is configured to increase the correction amount as a deviation between the change rate of the torque command value and the reference change rate is larger.

6. The driving force transmission device according to claim 1, wherein:
the control device is configured to correct the current command value by referring relation information indicating a relation of the change rate of the torque command value and the correction amount; and
the correction amount at a time of rise in the torque command value shown in the relation information and the correction amount at a time of fall in the torque command value shown in the relation information are values that are different only in sign.

7. A control method for a driving force transmission device, the driving force transmission device including: an input rotation member and an output rotation member that are configured to perform relative rotation coaxially; a multiple-disc clutch that includes a plurality of clutch plates among which frictional sliding is lubricated by a lubricant;

a pressing mechanism that is configured to press the multiple-disc clutch at a pressing force depending on an electric current that is supplied; and a control device, the driving force transmission device being configured to transmit a driving force of a vehicle from the input rotation member to the output rotation member by the multiple-disc clutch, the control method comprising:
  computing, with the control device, a torque command value based on a state of the vehicle, the torque command value being a driving force that needs to be transmitted by the multiple-disc clutch;
  computing, with the control device, a current command value corresponding to the torque command value;
  correcting, with the control device, the current command value so as to increase or decrease the current command value by a correction amount depending on a change rate of the torque command value; and
  supplying, with the control device, the electric current depending on the corrected current command value, to the pressing mechanism.

* * * * *